No. 871,011. PATENTED NOV. 12, 1907.
G. WARNE.
DITCHING MACHINE.
APPLICATION FILED MAR. 8, 1907.
2 SHEETS—SHEET 1.
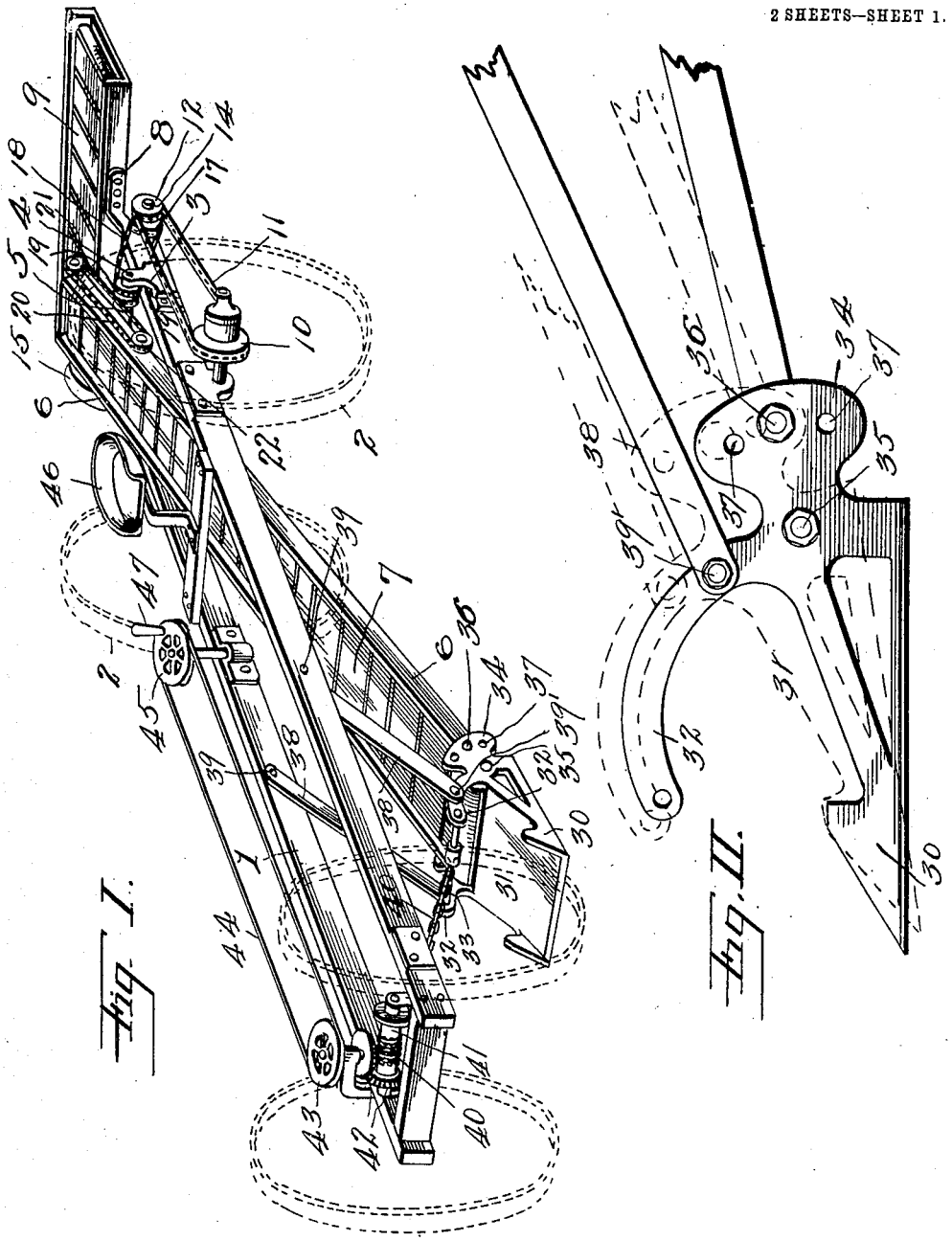

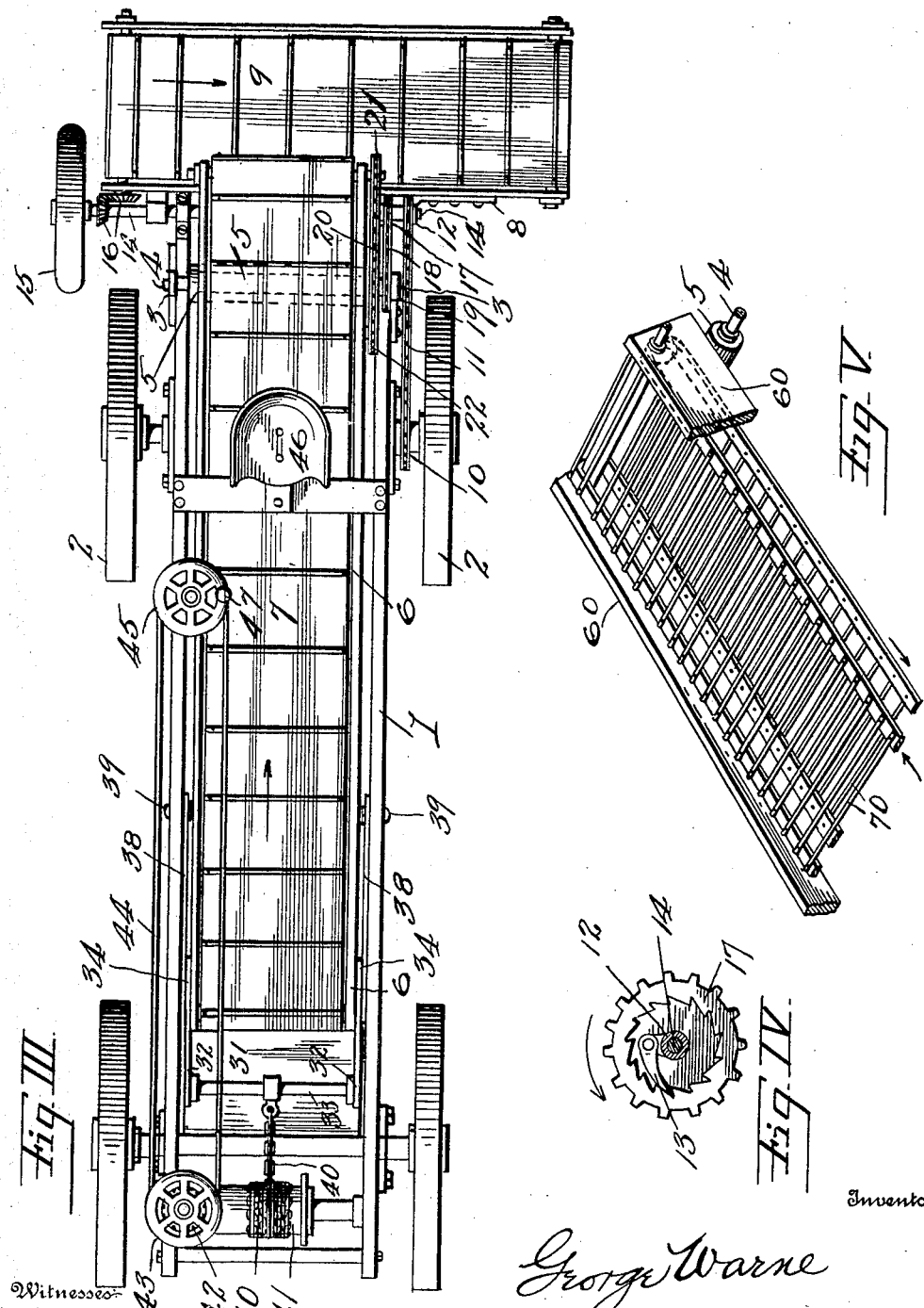

UNITED STATES PATENT OFFICE.

GEORGE WARNE, OF OMAHA, NEBRASKA.

DITCHING-MACHINE.

No. 871,011.　　　Specification of Letters Patent.　　　Patented Nov. 12, 1907.

Application filed March 8, 1907. Serial No. 361,224.

*To all whom it may concern:*

Be it known that I, GEORGE WARNE, a citizen of the United States, and resident of Omaha, Douglas county, State of Nebraska, have invented certain new and useful Improvements in Ditching-Machines; and my preferred manner of carrying out the invention is set forth in the following full, clear, and exact description, terminating with a claim particularly specifying the novelty.

This invention relates to excavators of the type including a plow and elevator with a side delivery, and the object of the same is to produce an improved machine for ditching purposes or which may be used for digging potatoes.

To this end the invention consists in the details described and claimed herein, and shown in the accompanying drawings wherein—

Figure I is a perspective view of the machine complete. Fig. II is a diagrammatic detail showing the adjustment of the plow. Fig. III is a plan view. Fig. IV is an enlarged detail showing the ratchet which permits the fly wheel to run after the machine has ceased its progress. Fig. V is a perspective detail of a portion of the elevator frame and elevator which are employed when the machine is used as a potato digger.

The main framework 1 is mounted on wheels 2 and will be drawn by a team or other means not necessary to show. Rising from the main framework near its rear end are rigid uprights 3 connected by a cross rod 4 on which between the uprights is journaled a roller 5, and the upper end of the frame 6 of the elevator passes loosely through the framework 1 and rests on this roller. Within this frame is mounted an endless carrier 7 which may be an apron having cross slats when the machine is used for ditching purposes, or may consist of two belts connected by cross slats 70 when the machine is used as a potato digger. In this case (see Fig. V) the elevator frame 60 will be open at the bottom so that as the potatoes are carried upward the dirt will be sifted through and will drop into the furrow just made by the plow. Otherwise all the dirt will be carried upward and delivered to one side as explained below. Mounted in supports 8 at the rear end of the main framework is a lateral carrier 9 designed to stand always beneath the upper end of the elevator, and which delivers to the side of the machine either the dirt when a ditch is being dug or the potatoes when the machine is used as a potato digger.

On the hub of one of the main wheels 2 is a driving wheel 10 connected by a sprocket chain 11 with a sprocket wheel 12 which in turn is connected by a ratchet 13 (see Fig. IV) with a counter-shaft 14 which is journaled across the framework 1 and carries a fly wheel 15 on its other end. Intermeshing gears 16 connect this shaft with one shaft of the carrier 9 to drive the latter. A sprocket 17 on the counter-shaft 14 is connected by a chain 18 with another sprocket 19 which is journaled on the cross rod 4 outside the adjacent upright 3 and has a double face. The teeth on the other face take into a sprocket chain 20 which connects a wheel 21 on the upper shaft of the elevator with an idle wheel 22 journaled on the elevator frame 6 some distance below its upper end.

As best seen in Fig. 2, the plow 30 and its moldboard 31 are inclosed between or form parts of a casting having two plow beams 32 connected at their upper front ends by a cross rod 33, and at one or both sides of this casting are sector plates 34 which stand outside the elevator frame 6. The latter is pivoted to the casting at the points 35, and bolts or other fastening means 36 take through holes 37 in the sector plates and into the sides of the frame 6 whereby the angle of the plow to the elevator can be adjusted. Links 38 pivotally connect the plow beams 32 at 39' with points 39 on the main framework 1 about as indicated, and in the rise and fall of the plow the latter will swing around these points as shown in Fig. II.

A chain 40 connects the cross rod 33 with a windlass 41 journaled on the front end of the main framework, and by preference this windlass is connected by intermeshing gears 42 with a horizontal pulley 43 which is belted as at 44 to another pulley 45 standing adjacent the driver's seat 46 and adapted to be turned by a crank handle 47.

The operation of this machine is as follows: In driving from place to place, the entire plow is raised so that it shall clear the ground. When the machine is to be used, the pulley 45 is turned in the proper direction by its crank handle to permit the plow to descend as low as necessary, and its angle to the elevator is adjusted by the bolts 36 and the holes 37 in the sector plates. Thereafter in the progress of the machine the material dug up by the plow will pass over the share onto the elevator, up the latter and off its rear end, and be delivered to one side by the lateral carrier 9. The rotation of the main wheels will drive the counter-shaft 14 through the sprocket 12 and ratchet 13, and if the machine should be stopped the fly wheel will continue to revolve for some little time. This countershaft is geared as at 16 to the lateral carrier and therefore drives it. This countershaft is also connected through the double-faced sprocket wheel 19 with the elevator, and therefore drives that. Hence the rotation of the countershaft by the fly wheel after the progress of the machine ceases will carry up what material is in the elevator and deliver it out the carrier. In the rise and fall of the elevator or in the adjustment of its angle to the plow, its frame may be moved upward or downward over the roller 5, and during such movement the point of engagement on the sprocket chain 20 with the sprocket wheel 19 will be automatically changed although the movement of the elevator will not be checked.

What is claimed as new is:

1. In a machine of the character described, the combination with the main framework, and an elevator therein; of the digging mechanism comprising a plow and moldboard, a pivotal connection between the elevator frame and the plow, perforated sector plates on the latter passing astride said frame, bolts removably taking through the perforations into the frame, and means for raising and lowering the plow.

2. In a machine of the character described, the combination with the main framework, and an elevator therein; of the digging mechanism comprising a plow and moldboard, a pivotal connection between the elevator frame and the plow, perforated sector plates on the latter passing astride said frame, bolts removably taking through the perforations into the frame, links pivotally connecting the main framework and the plow beam, and means for raising and lowering the plow.

3. In a machine of the character described, the combination with the main framework, an elevator whose frame is movably supported at its rear end by the framework so that it may slide longitudinally therein, and means for driving the elevator; of the digging mechanism pivoted to the lower end of the elevator frame, means for setting the digging mechanism at various angles to the frame, and means for raising and lowering the digging mechanism.

4. In a machine of the character described, the combination with the main framework, an elevator whose frame is movably supported at its rear end therein, and means for driving the elevator; of the digging mechanism pivoted to the lower end of the elevator frame, means for setting the digging mechanism at various angles to the frame, links pivotally connecting the main framework with the digging mechanism at other points than where the elevator is pivoted thereto, and means for raising and lowering the digging mechanism.

5. In a machine of the character described, the combination with the main framework, the digging mechanism, links pivotally connecting said framework and mechanism, and an elevator whose frame is attached to said mechanism; of a windlass on the framework, means for turning it from the driver's seat, and chains connecting the windlass and the digging mechanism.

6. In a machine of the character described, the combination with the main framework, uprights therein, a rod connecting them, a roller thereon, an elevator whose frame rests on the roller, and digging mechanism at the front end of the elevator; of a double-faced sprocket wheel journaled on said rod, connections between one face thereof and one of the main wheels, an idle pulley journaled on the elevator frame, and a sprocket chain connecting it with another pulley on the upper shaft of the elevator and leading intermediately over the other face of said double-faced sprocket.

7. In a machine of the character described, the combination with the main framework, uprights therein, a rod connecting them, a roller thereon, an elevator whose frame rests on the roller, digging mechanism at the front end of the elevator, and means for adjusting the angle of the elevator frame to the main framework and its position longitudinally therein; of a double-faced sprocket wheel journaled on said rod, connections between one face thereof and one of the main wheels, an idle pulley journaled on the elevator frame, and a sprocket chain connecting it with another pulley on the upper shaft of the elevator and leading intermediately over the other face of said double-faced sprocket.

8. In a machine of the character described, the combination with the main framework, a roller supported thereby, an elevator resting at its rear end on said roller, an idle pulley in the elevator frame, a sprocket chain connecting it with another pulley on the upper shaft of the elevator, digging mechanism at the front end of the elevator, and a lateral carrier on the main framework beneath the rear end of the elevator; of a countershaft journaled in the main framework, gears connecting it with one shaft of the lateral carrier, a sprocket engaging said chain on the elevator, connections between this sprocket and the countershaft, and connections between the latter and one main wheel.

9. In a machine of the character described, the combination with the main framework, a roller supported thereby, an elevator resting at its rear end on said roller, an idle pulley in the elevator frame, a sprocket chain connecting it with another pulley on the upper shaft of the elevator, digging mechanism at the front end of the elevator, and a lateral carrier on the main framework beneath the rear end of the elevator; of a countershaft journaled in the main framework and having a fly wheel, gears connecting this shaft with the lateral carrier, a sprocket wheel engaging said chain on the elevator, connections between this sprocket and the countershaft, a ratchet on the countershaft, and connections between the ratchet and one main wheel.

10. In a machine of the character described, the combination with the main framework, an elevator therein, digging mechanism carried thereby, and a lateral carrier on said framework; of a countershaft journaled in the framework and having a fly wheel, connections between this shaft and the carriers in the elevator and in said lateral carrier, a ratchet wheel on the countershaft, and connections between the ratchet wheel and one main wheel.

In testimony whereof I have hereunto subscribed my signature this the 2nd day of March, A. D. 1907.

GEORGE WARNE.

Witnesses:
PETER FITZGERALD,
O. A. HELQUEST.